United States Patent
Singh et al.

(10) Patent No.: US 10,165,622 B2
(45) Date of Patent: Dec. 25, 2018

(54) METHOD AND SYSTEM FOR SYNCHRONIZING COMMUNICATION BETWEEN NODES IN A BLUETOOTH NETWORK

(71) Applicant: Samsung Electronics Co., Ltd., Suwon-si, Gyeonggi-do (KR)

(72) Inventors: Ajeet Kumar Singh, Bangalore (IN); Arzad Alam Kherani, Bangalore (IN); Dae-Kyu Choi, Suwon-si (KR); Anand Sudhakar Chiddarwar, Bangalore (IN); Sang-Jun Moon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 15/172,887

(22) Filed: Jun. 3, 2016

(65) Prior Publication Data

US 2016/0366642 A1   Dec. 15, 2016

(30) Foreign Application Priority Data

Jun. 10, 2015 (IN) ............................ 2905/CHE/2015

(51) Int. Cl.
*H04W 84/18* (2009.01)
*H04W 52/02* (2009.01)
(Continued)

(52) U.S. Cl.
CPC ............. *H04W 84/18* (2013.01); *H04L 67/12* (2013.01); *H04W 4/70* (2018.02);
(Continued)

(58) Field of Classification Search
CPC . H04W 52/0212; H04W 84/18; H04W 4/005; H04W 56/001; H04L 67/12; Y02B 60/50
See application file for complete search history.

(56) References Cited

U.S. PATENT DOCUMENTS 8,737,917 B2 * 5/2014 Desai .................... H04W 8/005
                                                455/41.2
8,861,505 B1 * 10/2014 de la Broise ......... H04J 3/0658
                                                370/310
(Continued)

FOREIGN PATENT DOCUMENTS

WO    2014/138229 A1    9/2014

OTHER PUBLICATIONS

Mikhail Galeev et al., Designing a BLE advertise-only beacon, EE Times-Asia, 2013.
(Continued)

*Primary Examiner* — Hashim S Bhatti
(74) *Attorney, Agent, or Firm* — Jefferson IP Law, LLP

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. A method and an apparatus for synchronizing communication between nodes in a bluetooth low energy (BLE) mesh network. In the network, a node is configured to generates a seed value based on at least one of own transmission parameter, wherein the seed value indicates next data advertisement instance of corresponding node. Further, the seed value is used for communicating with other nodes (i.e. 1-hop neighbor nodes) in the network. Based on data transfer requirements of the node, the node synchronizes own data transmission and reception settings, such that no two nodes transmit data at the same time.

20 Claims, 6 Drawing Sheets

(51) Int. Cl.
*H04W 56/00* (2009.01)
*H04L 29/08* (2006.01)
*H04W 4/70* (2018.01)

(52) U.S. Cl.
CPC ..... *H04W 52/0212* (2013.01); *H04W 56/001* (2013.01); *Y02D 70/144* (2018.01); *Y02D 70/164* (2018.01); *Y02D 70/168* (2018.01); *Y02D 70/21* (2018.01); *Y02D 70/22* (2018.01); *Y02D 70/26* (2018.01)

(56) References Cited

U.S. PATENT DOCUMENTS

| | | | | |
|---|---|---|---|---|
| 8,942,201 | B1* | 1/2015 | Duvvuri | H04W 56/00 370/329 |
| 2012/0263084 | A1* | 10/2012 | Liu | H04W 52/0216 370/311 |
| 2013/0100852 | A1* | 4/2013 | Jeon | H04L 45/20 370/254 |
| 2013/0142124 | A1* | 6/2013 | Abraham | H04W 28/06 370/328 |
| 2013/0201838 | A1* | 8/2013 | Homchaudhuri | H04W 52/0245 370/242 |
| 2013/0235166 | A1* | 9/2013 | Jones | H04N 13/167 348/51 |
| 2015/0289207 | A1* | 10/2015 | Kubo | H04W 52/0219 370/311 |
| 2015/0358786 | A1* | 12/2015 | Kim | H04L 12/189 370/311 |
| 2016/0135115 | A1* | 5/2016 | Patil | H04W 48/16 370/338 |
| 2016/0150465 | A1* | 5/2016 | Jung | H04W 48/16 370/254 |
| 2016/0183205 | A1* | 6/2016 | Li | H04W 8/005 370/350 |
| 2016/0309393 | A1* | 10/2016 | Amini | H04W 40/244 |

OTHER PUBLICATIONS

V. S. Borkar et al., Closed and Open Loop Optimal Control of Buffer and Energy of a Wireless Device, Proceedings of WiOpt 2005, Apr. 3, 2005.

* cited by examiner

METHOD AND SYSTEM FOR SYNCHRONIZING COMMUNICATION BETWEEN NODES IN A BLUETOOTH NETWORK

CROSS-REFERENCE TO RELATED APPLICATION(S)

This application claims the benefit under 35 U.S.C. § 119(a) of an Indian patent application filed on Jun. 10, 2015 in the Indian Intellectual Property Office and assigned Serial number 2905/CHE/2015, the entire disclosure of which is hereby incorporated by reference.

TECHNICAL FIELD

The present disclosure relates to Bluetooth networks. More particularly, the present disclosure relates to synchronize communication between nodes in a Bluetooth network.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Bluetooth low energy (BLE)/Bluetooth network is a wireless personal area network technology, aimed to provide low cost Bluetooth connection between devices. BLE operates in the same Industrial, Scientific & Medical (ISM), license-free, 2.4- to 2.483-GHz frequency band as that of classic Bluetooth, and relays on frequency hopping technology. Certain features of the BLE wireless technology such as, but not limited to ultra-low peak, average and idle mode power consumption, ability to run for years on standard coin-cell batteries, low cost, multi-vendor, interoperability and enhanced range, robustness equal to Classic Bluetooth technology, good real-time features (if a small number of nodes are connected), and very short wake-up/connection time makes it suitable for use in devices such as watches, toys, toothbrush, mobile phones, medical devices and so on.

In the case of data transfer over connectionless BLE networks, certain nodes directly receive data from the transmitting node, some nodes receive data being relayed by other nodes in the network. The node (which is not the destination) that receives the data from another node needs to relay the data to other nodes in the network, so that the data finally reaches the destination. One disadvantage of these connectionless transfer based BLE mesh networks is that more than one node may communicate/transmit data at the same time. This causes interference, which in turn results in loss of data. Another disadvantage of the existing BLE mesh networks is that all nodes listen to the network (i.e. scans the network for messages) all the time. In any communication device that serves as a node in the network, scanning is done at the expense of power. This is even more critical in the case of portable/mobile devices, as the battery life is a major concern.

The above information is presented as background information only to assist with an understanding of the present disclosure. No determination has been made, and no assertion is made, as to whether any of the above might be applicable as prior art with regard to the present disclosure.

SUMMARY

An object of the various embodiments of the present disclosure herein is to provide a node in a Bluetooth Low Energy (BLE) mesh network/Bluetooth network to measure own data transmission requirements.

Another object of the various embodiments of the present disclosure herein is to provide a node to dynamically generate a seed value that represents a next data advertisement time instance of the node.

Another object of the various embodiments of the present disclosure herein is to provide a node to communicate the generated seed value to other nodes in the BLE mesh network.

Another object of the various embodiments of the present disclosure herein is to provide a node to synchronize data transmission and data reception settings based on at least one seed value communicated by other nodes in the BLE mesh network.

Aspects of the present disclosure are to address at least the above-mentioned problems and/or disadvantages and to provide at least the advantages described below. Accordingly, an aspect of the present disclosure is to provides a method for synchronizing communication of at least two nodes of a plurality of nodes in a bluetooth low energy (BLE) mesh network. The method comprises generating a first seed value, by a first node in the BLE mesh network, wherein the seed value indicates next data advertisement instance of the first node. The first node transmits the first seed value to the second node, and receives the second seed value from the second node. Further, the first node synchronizes at least one of a data transmission setting and a data reception setting for communication between the first node and the second node, based on at least one of the first seed value and the second seed value.

Another aspect of the present disclosure is to provide an apparatus for synchronizing communication of at least two nodes of a plurality of nodes in a BLE mesh network. Initially, a first seed value is generated by a processing module in a first node, wherein the seed value indicates next data advertisement instance of the first node. The first seed value is transmitted to a second node in the BLE mesh network, by an interface module in the first node, and the second seed value is received from the second node. And the processing module synchronizes at least one of a data transmission setting and a data reception setting for communication between the first node and the second node, based on at least one of the first seed value and the second seed value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
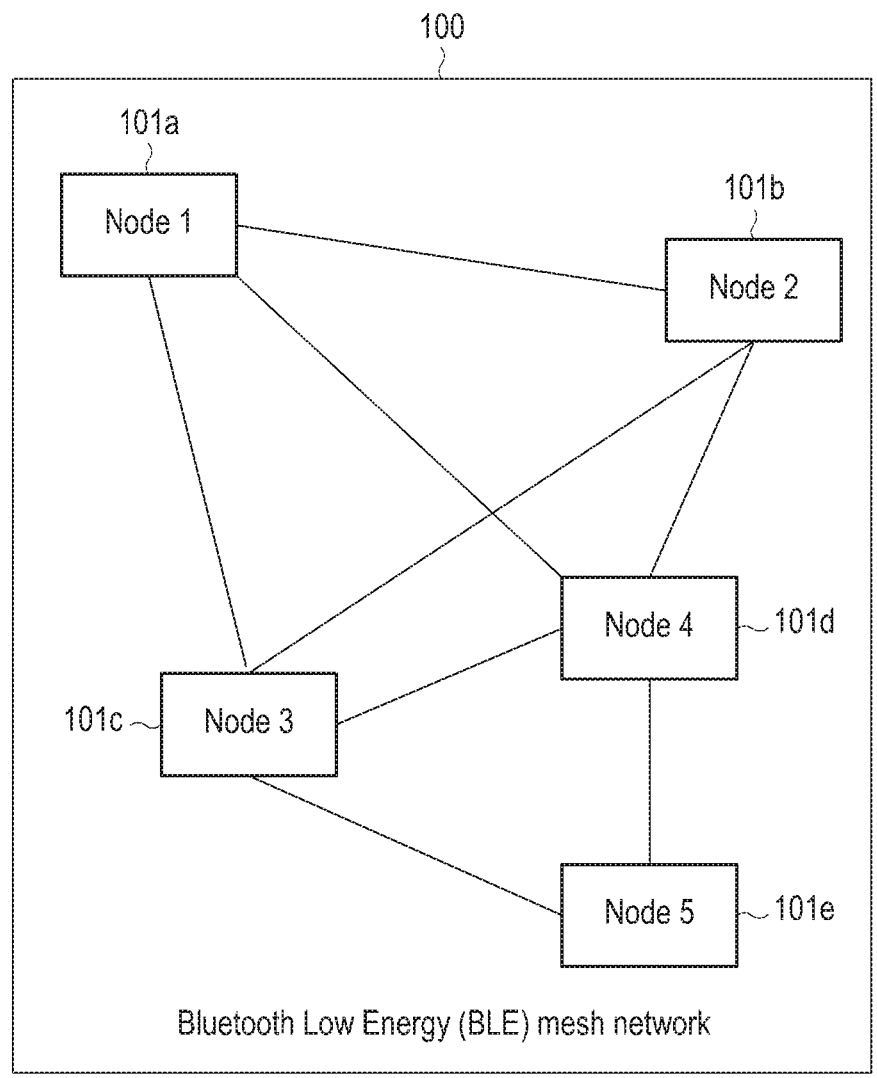
FIG. 1 illustrates a block diagram which depicts a Bluetooth Low Energy (BLE) mesh network, according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the " include plural referents unless the context clearly dictates otherwise. Thus, for example, reference to "a component surface " includes reference to one or more of such surfaces.

Before undertaking the DETAILED DESCRIPTION below, it may be advantageous to set forth definitions of certain words and phrases used throughout this patent document: the terms "include " and "comprise, " as well as derivatives thereof, mean inclusion without limitation; the term "or," is inclusive, meaning and/or; the phrases "associated with " and 'associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

The various embodiments of the present disclosure herein disclose a method and system for synchronized communication between nodes in a Bluetooth Low Energy (BLE) mesh network/Bluetooth network by synchronizing data transmission and data reception time of nodes in the BLE mesh network. Referring now to the drawings, and more particularly to FIGS. 1 through 4C, where similar reference characters denote corresponding features consistently throughout the figures, there are shown embodiments.

FIG. 1 illustrates a block diagram which depicts a Bluetooth Low Energy (BLE) mesh network, according to various embodiments of the present disclosure.

Referring to FIG. 1, the BLE mesh network 100 (hereinafter referred to as "network") comprises of a plurality of nodes 101a, 101b, 101c, 101d, and 101e (denoted as a reference number 101). It is to be noted that the terms Bluetooth Low Energy (BLE) mesh network and Bluetooth network are used interchangeably, throughout the specification.

A node 101 can be any User Equipment and/or network component that can be configured to connect with at least one other node 101, to form a network 100, wherein each message broadcasted by a node 101 to reach destination node(s) in the network 100. For example, the node 101 can be a mobile phone, a laptop, a tablet computer or any such device with Bluetooth connectivity support. It is to be noted that the network 100 as in the FIG. 1 is formed using 5 nodes 101. However, the number of nodes 101 that constitute that network 100 can vary based on requirements. Further, all nodes 101 in the network 100 can be considered equivalent to each other in terms of functioning.

In an embodiment, each node 101 can be configured to generate and transmit at least one own data transmission requirement, preferably in terms of data transmission intervals, as a seed value, to other nodes 101 in the network. Other nodes 101 in the network 100 can be configured to identify transmission interval of the node 101 that transmitted the seed value, upon receiving the seed value. Each node 101 in the network 100 can be further configured to synchronize own data transmission and data reception settings, such that no two nodes i.e. 1-hop neighboring nodes transmit data at the same time. In a preferred embodiment, each node 101 in the network 100 can be configured to synchronize data transmission and data reception settings, based on seed value of corresponding 1-hop neighbor nodes. It is to be noted that the terms 'other nodes' and '1-hop neighbor nodes' are used interchangeably throughout the specification. Each node 101 in the network 100 can be further configured to enter a scan mode, at time intervals in which another node 101 in the network 100 transmits the data, and collect the data transmitted by one other node 101. The node 101 can be further configured to add delay or offset to extent or lower the scanning time, according to requirements. The node 101 can be further configured to enter an idle mode when no other node 101 in the network 100 is transmitting data. In a preferred embodiment, the seed value is encoded in header of all control and data messages transmitted by the node 101.

The node 101 can be further configured to encode, in addition to the seed value, at least one additional parameter, that can be used to synchronize the data transmission and data reception settings in certain scenarios, in header of control and data messages. A few examples of such additional parameters are mentioned below:

1. Role
2. Length of data to be transmitted
3. Start and End of data
4. Priority (indicating emergency data)

The node 101 can be further configured to transmit own messages, receive at least one message, and/or act as a relay node. Function of the relay node is to act as an intermediate node for another two nodes 101 to communicate. In this scenario, the relay node receives the message being transmitted by another node, and relays to another node, which can be the destination of the message. In various embodiments, the network 100 can be connection-oriented or connectionless. If the network 100 is a connection oriented type, the synchronization (of data transmission and data reception) is done dynamically while setting up the network 100 i.e. while establishing connections between nodes 101 in the network 100. If the network 100 is a connectionless type, then the synchronization is done in real-time, while nodes 101 in the network 100 are communicating each other.

Figure 2:
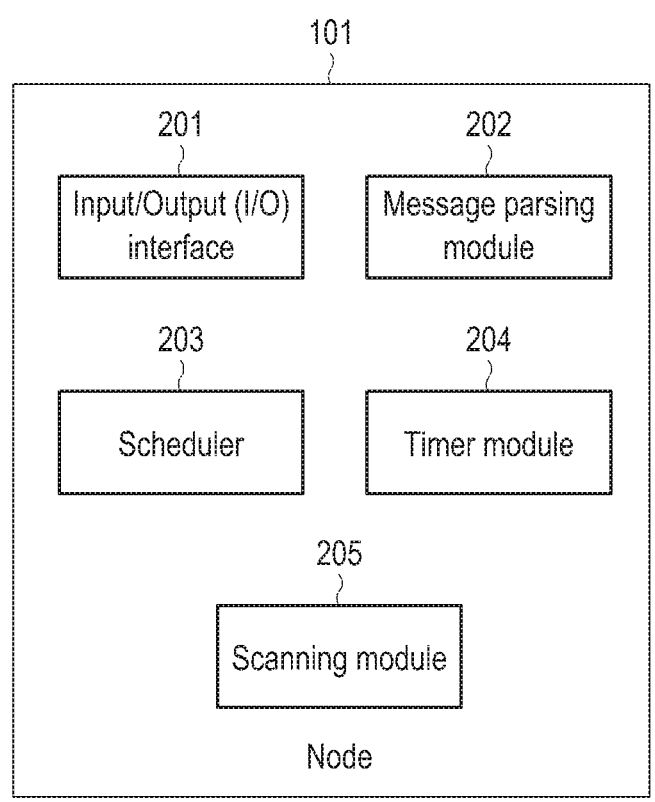
FIG. 2 is a block diagram which depicts components of a node in the BLE mesh network, according to various embodiments of the present disclosure.

FIG. 2 is a block diagram which depicts components of a node in the BLE mesh network, according to various embodiments of the present disclosure. The node 101 comprises of an Input/Output (I/O) interface 201, a message parsing module 202, a scheduler 203, a timer module 204, and a scanning module 205.

Referring to FIG. 2, the I/O interface 201 can be configured to provide at least one channel with at least one suitable communication protocol, for the node 101 to communicate with at least one other node 101, and/or one other network component. The I/O interface 201 can be further configured to provide at least one interface for a user to communicate with the node 101. The I/O interface 201 can be further configured to transmit and receive all sort of messages (which may be existing and user-defined) as part of the BLE communication.

The message parsing module 202 can be further configured to collect at least one message from the I/O interface 201 and/or the scanning module 205, and parse the message to extract components of the message. For example, the message parsing module 202 can extract the seed value being communicated by other nodes 101, and transmit the seed value to the scheduler 203.

The scheduler 203 can be configured to identify, based on seed value received from every other node 101 in the network 100, corresponding transmission intervals of each node 101. The scheduler 203 can be further configured to schedule transmission intervals of own node 101, at an interval that do not overlap with transmission time of any other node 101. The scheduler 203 can be further configured to instruct the scanning module 205, to perform scanning, at the transmission intervals of at least one other node 101 in the network 100.

The scanning module 205 can be configured to enter a scanning mode and perform scanning, at transmission intervals specified by other nodes 101 in the network 100. The scanning module 205 can be further configured to synchronize the scanning intervals, with the help of the timer module 204. The scanning module 205 can be further configured to enter an idle mode at times when no other node 101 in the network 100 is transmitting any data.

Figure 3:
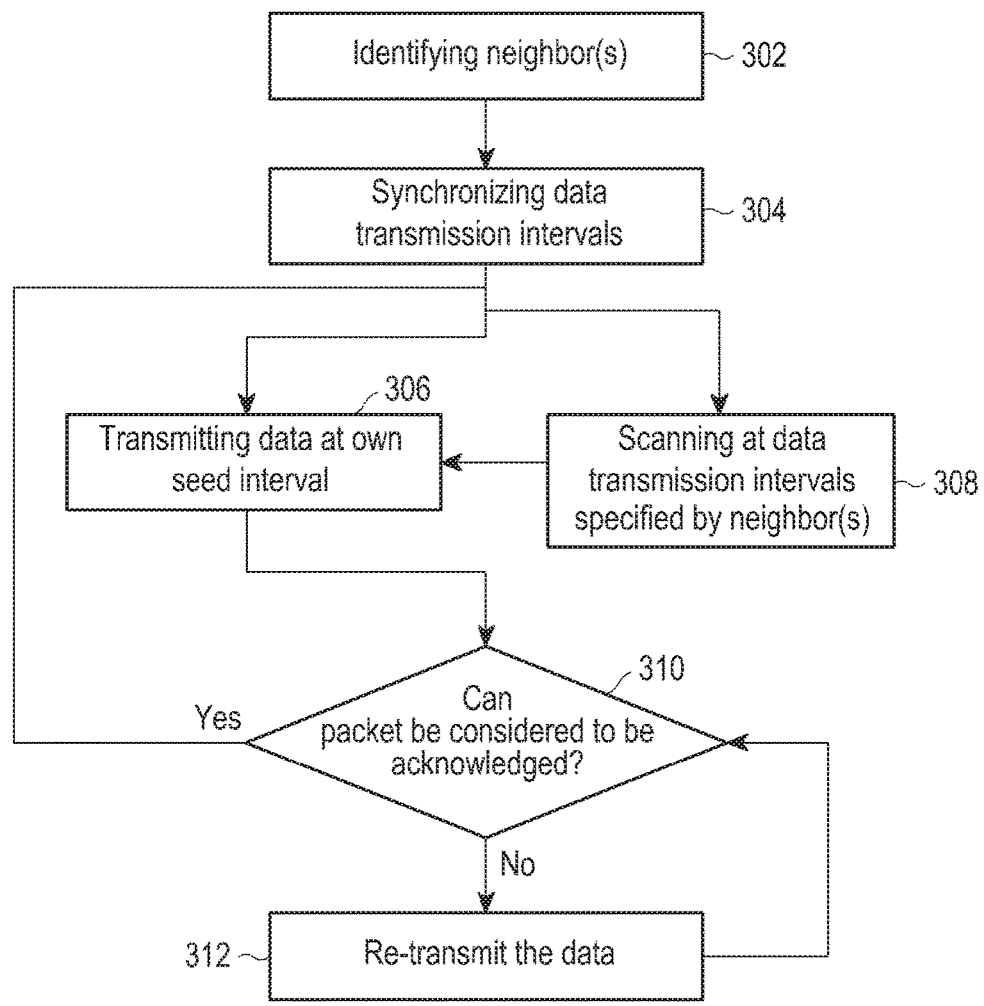
FIG. 3 is a flow diagram that shows steps involved in the process of communicating data using synchronized communication between nodes in a BLE mesh network, according to various embodiments of the present disclosure.

FIG. 3 is a flow diagram that shows steps involved in the process of communicating data using synchronized communication between nodes in a BLE mesh network, according to various embodiments of the present disclosure.

Referring to FIG. 3, a node 101 initially identifies in operation 302 at least one other node 101 in the network 100. In a preferred embodiment, the node 101 identifies at least one other node 101, by executing a service advertisement process (as depicted in FIG. 4B). In the service advertisement process, the node 101 starts a new thread, and sends service advertisements. The node 101 also scans for service advertisements from at least one other node 101. If at least one other node 101 is found within a specified time period, the node 101 enters a data transmission/data advertisement period.

Figure 4A:
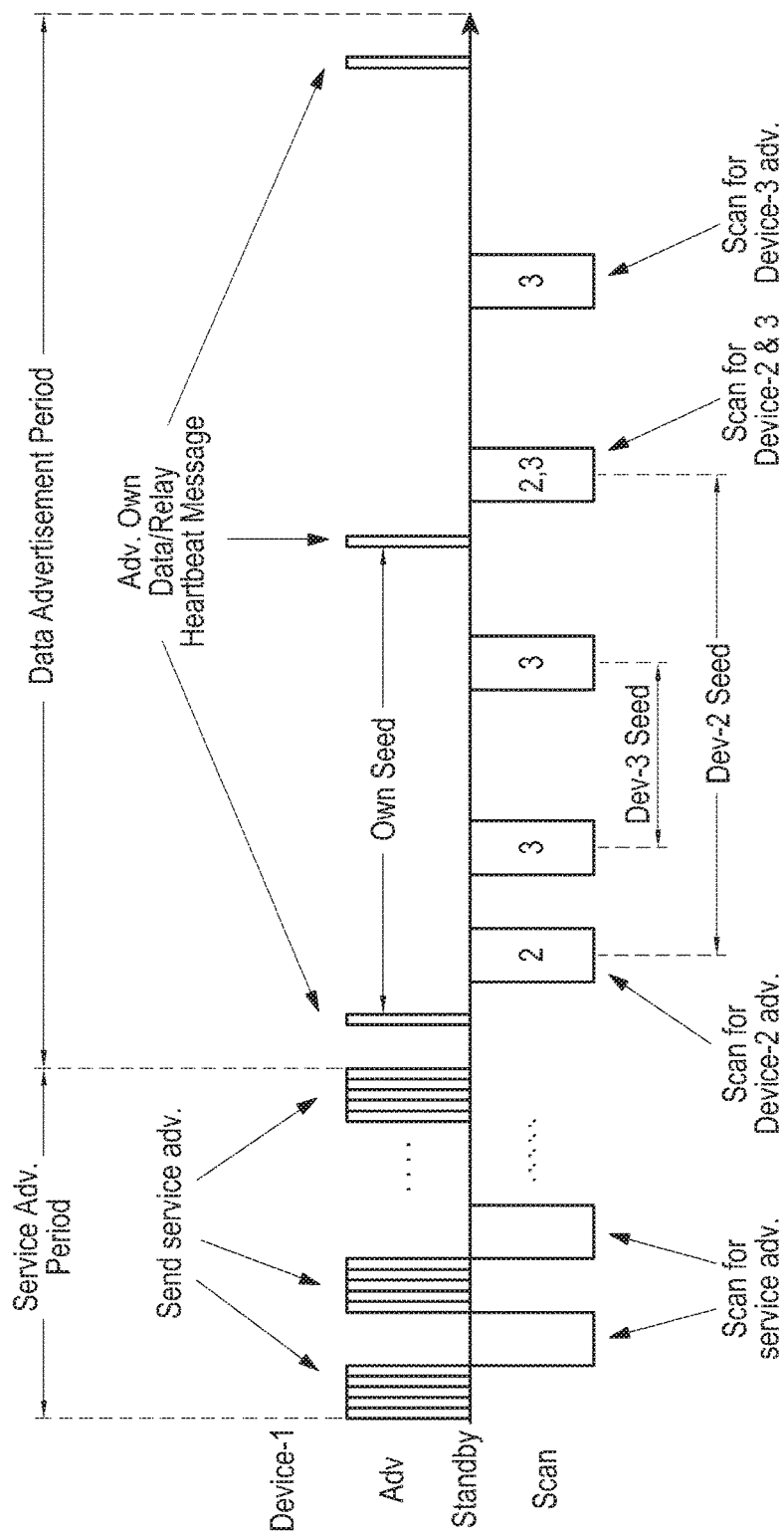
FIG. 4A is a diagram that depicts working of an example implementation of the synchronized BLE mesh network, according to various embodiments of the present disclosure.
Figure 4B:
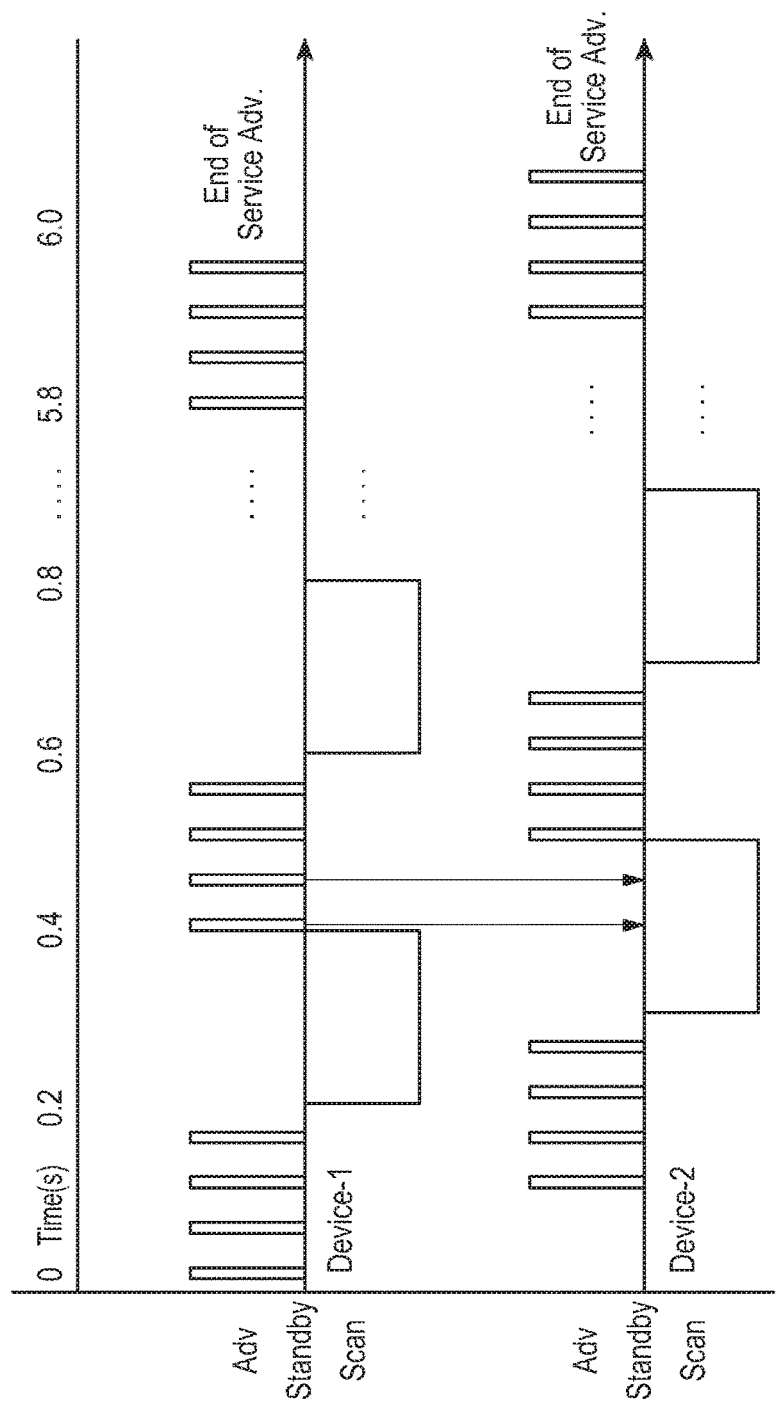
FIGS. 4B and 4C are example figures that depict service advertisement and data advertisement process in a BLE mesh network that use seed based synchronization, according to various embodiments of the present disclosure.
Figure 4C:
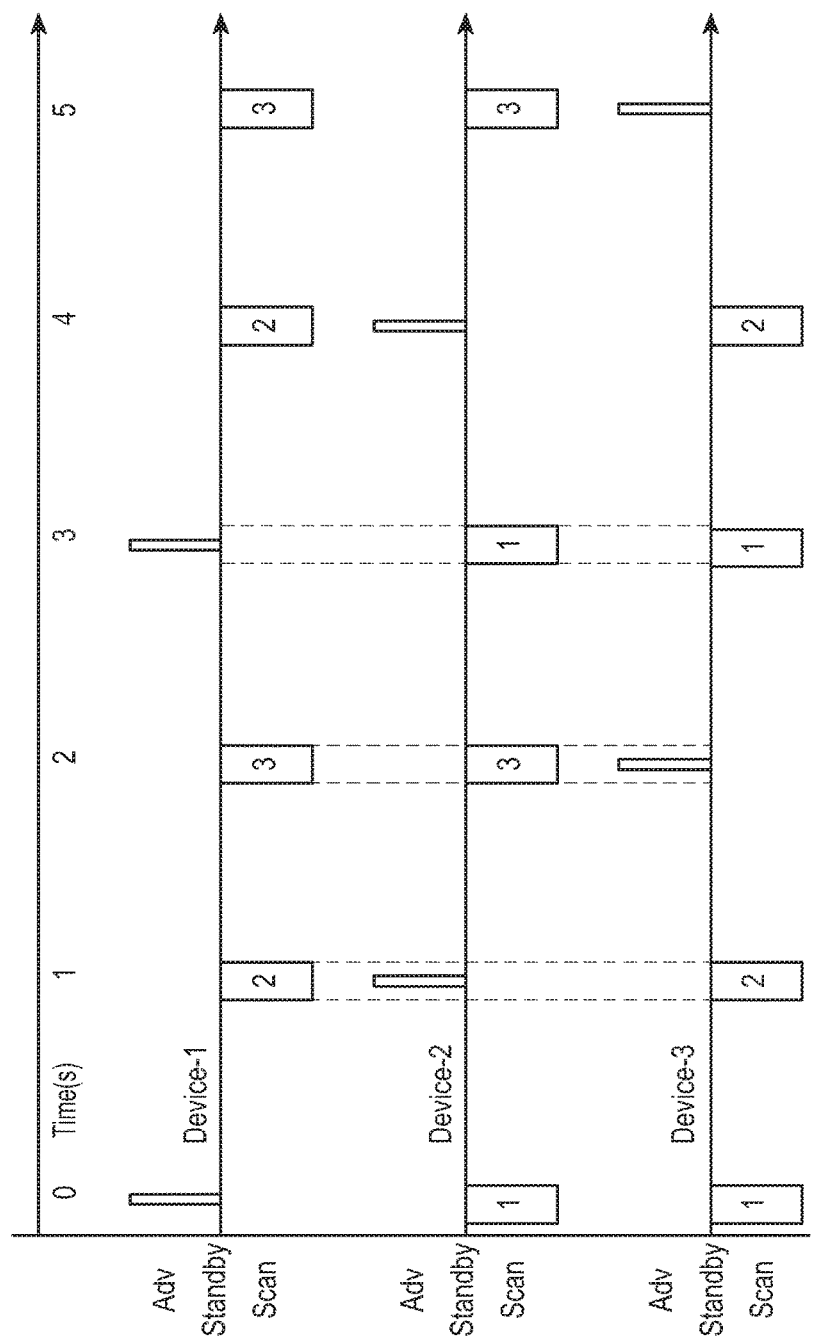

In the data transmission over advertisement phase (as depicted in FIG. 4C), the node 101 advertises and transmits data to at least one destination node. In a preferred embodiment, while transmitting control and data packets related to the data being transmitted, the node 101 generates a seed value, wherein the seed value indicates parameters such as but not limited to transmission intervals, length of data, and priority of data. The seed value can be generated based on at least one parameter such as, but not limited to traffic load, battery level of the node, role criticality, and urgency of data to be transmitted.

In operation 304, each node 101 in the network 100 can be configured to synchronize, based on the seed value communicated by every other node 101 in the network 100, own data transmission and data reception parameters. In operation 306, the node 101 transmits data and control messages, at the time specified in the seed value transmitted. In operation 308, the same node 101 enters a scan mode and scans the network for messages from another node 101 in the network, at a specified transmission interval of that particular node. For example, while a first node 101a (as depicted in FIG. 1) is transmitting data at the specified transmission interval, other nodes 101 in the network 100 enters a scan mode, and scans for any message from the first node. This transmission and scanning processes are repeated by all nodes 101 in the network.

For example, consider a seed based synchronization scenario (as depicted in FIG. 4C) in which the network 100 comprises of three nodes 101; node 1, node 2, and node 3, which are represented by the numbers 1, 2, and 3 respectively. As depicted, the node 1 transmits advertisement at time instance '0', and at the same time, node 2 and node 3 enters scan mode and scans for message from node 1. Further, the node 2 transmits advertisement at time instance '1', and the node 1 and node 3 scans the network for messages from node 2 at the same time. Similarly, node 1 and node 2 enters scan mode and scans for messages from node 3, while the node 3 is transmitting advertisement at time instance '2'. Here, the working of node 1, node 2, and node 3 are synchronized such that each node is aware of data transmission interval of every other node i.e. corresponding 1-hop neighbor nodes and their 1-hop neighbor nodes in the network 100, and accordingly synchronizes own data transmission and reception intervals.

In an embodiment, in a scenario wherein a node 101 receives an urgent message, and needs to transmit ahead of the scheduled transmission interval, a flag value that indicates the urgency can be added in the header of data and control messages being transmitted, and other nodes 101, upon seeing this flag value, can adjust the data transmission intervals accordingly. In an embodiment, the data transmission and scan intervals of the node 101 can be made equal, so as to increase probability of reception of messages by the nodes. Further, scanning intervals can be decided such that the scan starts prior to the data transmission interval specified by the other node 101, and ends after the transmission interval of the other node 101. This can help to receive data even if there is a delay in the data transmission.

For reliability in data transfers, after transmitting a data, the node 101 that transmitted the data can wait for an acknowledgement, for a pre-set time period, and check if the data packet can be considered to be acknowledged in operation 310. In a preferred embodiment, the acknowledgement in this scenario is based on an 'overhearing' condition in which the node 101 that transmitted the data receives the same packet, while at least one other 1-hop neighbor node 101 that received the data retransmits/relays it. The node 101 that transmitted the data can be configured to consider the relay/retransmission of same data back from at least one other node, as an acknowledgement for the data transmitted. In operation 312, if the acknowledgement is not received within a pre-set time period, the node 101 can re-transmit the data, based on application requirements. The various actions in method 300 may be performed in the order presented, in a different order or simultaneously. Further, in some embodiments, some actions listed in FIG. 3 may be omitted.

FIG. 4A is an example diagram that depicts working of a node in the synchronized BLE mesh network, according to various embodiments of the present disclosure.

Referring to FIG. 4A, the node 101 is referred to as device 1, in the FIG. 4A. In the FIG. 4A, blocks above the 'standby line' indicate advertisement events i.e. data transmission intervals by the node 1, and the blocks below the standby line indicate the time intervals at which the node 101 scans for advertisements from other nodes.

The data transmission by the node 1 at the service advertisement period, as well as at the data advertisement period also is depicted in the FIG. 4A. As depicted, in the service advertisement period, the node 1 sends frequent messages to identify at least one other node in the network 100. Further, in the data advertisement period, the node transmits data only in the data transmission intervals indicated by the seed value generated, and scans for messages from other nodes, in the data transmission intervals specified in seed values transmitted by each of those nodes.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein specify a system for synchronizing working of nodes in a BLE mesh network. The mechanism allows synchronization of data transmission and reception intervals, providing a system thereof. Therefore, it is understood that the scope of protection is extended to such a system and by extension, to a computer readable means having a message therein, said computer readable means containing a program code for implementation of one or more steps of the method, when the program runs on a server or mobile device or any suitable programmable device. The method is implemented in a preferred embodiment using the system together with a software program written in, for ex. Very high speed integrated circuit Hardware Description Language (VHDL), another programming language, or implemented by one or more VHDL or several software modules being executed on at least one hardware device. The hardware device can be any kind of device which can be programmed including, for ex. any kind of a computer like a server or a personal computer, or the like, or any combination thereof, for ex. one processor and two FPGAs. The device may also include means which could be for ex. hardware means like an ASIC or a combination of hardware and software means, an ASIC and an FPGA, or at least one microprocessor and at least one memory with software modules located therein. Thus, the means are at least one hardware means or at least one hardware-cum-software means. The method embodiments described herein could be implemented in pure hardware or partly in hardware and partly in software. Alternatively, the embodiment may be implemented on different hardware devices, for ex. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RANI), compact disc ROMs (CD-ROMs), magnetic tapes, floppy disks, optical data storage devices, and carrier waves (such as data transmission through the internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RANI, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for synchronizing communication of at least two nodes of a plurality of nodes in a bluetooth low energy (BLE) mesh network, the method comprising:
   identifying, by a first node, one or more second nodes in the BLE mesh network in a service advertisement period;
   generating a first seed value by the first node in the BLE mesh network, wherein the first seed value indicates next data advertisement instance of the first node;
   transmitting, by the first node, the first seed value to the one or more second nodes in the service advertisement period;
   receiving, by the first node, a second seed value from the one or more second nodes, wherein the second seed value indicates next data advertisement instance of the one or more second nodes in the service advertisement period;
   synchronizing, by the first node, a data transmission setting and a data reception setting for communication between the first node and the one or more second nodes, based on the first seed value and the second seed value;
   transmitting, by the first node, data at data transmission intervals indicated by the data transmission setting in a data advertisement period;
   receiving, by the first node, data at data reception intervals indicated by the data reception setting in the data advertisement period; and adjusting, by the first node, the data transmission intervals determined based on an urgency of data to be transmitted or received,
wherein the data transmission intervals and the data reception intervals do not overlap in the data advertisement period.

2. The method as claimed in claim 1, wherein the first seed value is generated based on at least one transmission parameter of the first node.

3. The method as claimed in claim 2, wherein the at least one transmission parameter of the first node includes at least one of transmission intervals, a length of the data, and a priority of the data.

4. The method as claimed in claim 1, wherein the second seed value is generated based on at least one transmission parameter of the one or more second nodes.

5. The method as claimed in claim 4, wherein the at least one transmission parameter of the one or more second nodes includes at least one of transmission intervals, a length of the data, and a priority of the data.

6. The method as claimed in claim 1, wherein the one or more second nodes are a 1-hop neighbor of the first node.

7. The method as claimed in claim 1, wherein the transmitting the first seed value to the one or more second nodes comprises encoding the first seed value in at least one of a control message and a data message, by the first node.

8. The method as claimed in claim 1, wherein the receiving the second seed value from the one or more second nodes comprises acquiring the second seed value encoded in at least one of a control message and a data message transmitted by the one or more second nodes.

9. The method as claimed in claim 1, wherein data transmitted or received before adjusting the data transmission intervals includes a flag value which indicates the urgency of the data to be transmitted or received.

10. The method as claimed in claim 1, further comprising:
receiving, by the first node, same data transmitted to the one or more second nodes, from the one or more second nodes, for a pre-set time after transmitting the data.

11. An apparatus for synchronizing communication of at least two nodes of a plurality of nodes in a bluetooth low energy (BLE) mesh network, the apparatus comprising:
a scheduler configured to:
identify one or more second nodes in the BLE mesh network in a service advertisement period,
generate a first seed value, wherein the first seed value indicates next data advertisement instance of a first node,
synchronize a data transmission setting and a data reception setting for communication between the first node and the one or more second nodes, based on the first seed value and a second seed value, wherein the second seed value indicates next data advertisement instance of the one or more second nodes in the service advertisement period, and
adjust data transmission intervals determined based on an urgency of data to be transmitted or received; and
an input/output interface configured to:
transmit the first seed value to the one or more second nodes in the service advertisement period,
receive the second seed value from the one or more second nodes,
transmit data at the data transmission intervals indicated by the data transmission setting in a data advertisement period, and
receive data at the data reception intervals indicated by the data reception setting in the data advertisement period.

12. The apparatus as claimed in claim 11, wherein the first seed value is generated based on at least one transmission parameter of the first node.

13. The apparatus as claimed in claim 12, wherein the at least one transmission parameter of the first node includes at least one of transmission intervals, a length of the data, and a priority of the data.

14. The apparatus as claimed in claim 11, wherein the second seed value is generated based on at least one transmission parameter of the one or more second nodes.

15. The apparatus as claimed in claim 14, wherein the at least one transmission parameter of the one or more second nodes includes at least one of transmission intervals, a length of the data, and a priority of the data.

16. The apparatus as claimed in claim 11, wherein the one or more second nodes are a 1-hop neighbor of the first node.

17. The apparatus as claimed in claim 11, wherein the scheduler is further configured to transmit the first seed value to the one or more second nodes, by encoding the first seed value in at least one of a control message and a data message.

18. The apparatus as claimed in claim 11, wherein the scheduler is further configured to acquire the second seed value encoded in at least one of a control message and a data message transmitted by the one or more second nodes.

19. The apparatus as claimed in claim 11, wherein data transmitted or received before adjusting the data transmission intervals includes a flag value which indicates the urgency of the data to be transmitted or received.

20. The apparatus as claimed in claim 11, wherein the scheduler is further configured to receive same data transmitted to the one or more second nodes, from the one or more second nodes, for a pre-set time after transmitting the data.

* * * * *